Patented Apr. 1, 1941

2,237,084

UNITED STATES PATENT OFFICE 2,237,084

BLUEPRINT COATING

Robert Bowling Barnes and Leonard Patrick Moore, Stamford, and Garnet Philip Ham, Old Greenwich, Conn., assignors to American Cyanamid Company, New York, N. Y., a corporation of Maine No Drawing. Application August 28, 1940, Serial No. 354,600

3 Claims. (Cl. 95—7)

This invention relates to blueprint coating compositions.

Blueprint paper presents a number of problems. In the first place, the paper must show a good speed and latitude and give satisfactory depths of blue after a reasonable exposure. It must also show a white background on the unexposed portions when developed, and it should retain this characteristic for a considerable period of time when stored in the dark. In a sense, the two requirements are antagonistic as greater speed is often associated with bluer backgrounds whereas paper with good keeping qualities may show diminished speed.

It has also been noted that the instability of a blueprint paper is accelerated by adverse environmental conditions, especially heat and moisture such as are encountered in summer weather. The reactions which take place are probably complex but apparently result in auto-reduction of certain amounts of the ferric salt. The problem of keeping blueprint paper during the summer is therefore of particular importance in the art.

Increased stability with satisfactory speed, latitude, and blue intensities is achieved when a solution, prepared as described and claimed in the patent of Barnes, 2,218,969, October 22, 1940, is used to coat the paper. These blueprinting solutions employ ferric guanidine oxalate as the light-sensitive ferric salt in place of ferric ammonium oxalate, ferric ammonium citrate or ferric potassium oxalate commonly used, and paper coated therewith shows a marked increase in keeping qualities over the ordinary type blueprint paper.

We have found that the same improvement with regard to stability of the blueprint paper, and in addition increased speed with deeper blue intensities are obtained when ferric oxalate and guanidine oxalate, in approximately stoichiometrical amounts to form ferric guanidine oxalate, are added to the blueprint solution. It is an advantage of the present invention, therefore, that the pure ferric guanidine oxalate as such does not have to be added to the blueprinting solution, but the same increased stability is achieved if the constituents as simpler salts are employed. In other words, if ferric guanidine oxalate is not readily available to the blueprint coater, he can make up a blueprinting solution that has a high printing speed as well as extraordinary stability even under warm, moist conditions by employing the present process.

It is not known exactly why the solutions of the present invention show improvements in speed and latitude over blueprinting solutions in which pure ferric guanidine oxalate is added in the crystalline form, but it is thought that the ferric guanidine oxalate formed in the solution by reaction of the ferric oxalate and guanidine oxalate is in a chemical state that differs in activity from that of a solution of the crystalline compound. The chemistry of ferric compounds used in blueprinting is very complex, and it is not intended to limit the present invention by the above proposed explanation, as very likely a number of other factors are involved.

According to the present invention we have mixed a guanidine oxalate solution which preferably has a pH value between 5 and 6 with an aqueous solution of ferric oxalate. A ferricyanide such as potassium ferricyanide is then added to produce a highly photo-sensitive coating composition.

In making up the blueprint solutions we have found that best results are obtained when the guanidine oxalate is in the acid range when it is added to ferric oxalate. Guanidine oxalate which has been allowed to stand in the dry form over long periods of time generally increases in alkalinity and such a product does not give as satisfactory results when used in blueprinting compositions as the freshly prepared acidified guanidine oxalate. Moreover, if the coating solution is acidified after dissolving and mixing of all the constituents, the same important results which characterize the present invention are not obtained. A correlation of this apparent importance of pH adjustment with the theory of action proposed above, suggests that perhaps ferric guanidine oxalate in one chemical or physical form is produced under acid conditions, while a different form of the compound is obtained if an alkaline solution of guanidine oxalate is reacted with ferric oxalate, nor is it possible to shift from one form of the ferric guanidine oxalate to the other merely by a change in the pH value of the solution. As has already been pointed out above this explanation is probably only a partial answer and is not intended to be conclusive. As far as the present invention is concerned we are not concerned with theories but with new blueprinting solutions whose improved characteristics render them of special value in the blueprint art.

The invention will be further described in conjunction with the following example which illustrates a typical coating composition. The parts are by weight except in the case of liquids in which the corresponding parts by volume are given.

Example 1

23.50 parts of guanidine oxalate are mixed with 50 parts of water and the solution acidified with oxalic acid to produce a pH of 6.0 at 25° C. A second solution is made up as follows: 14 parts of ferric oxalate are dissolved in 50 parts of water by heating to 60° C., cooling the solution to room temperature and filtering. The two solutions are then combined under dark room conditions forming a green solution. A third solution containing 3 parts of potassium ferricyanide in 60 parts of water is then added to the mixture. The color of the coating is a light yellow when viewed under daylight conditions.

The same grade of paper was coated with a solution made up as above except that an equivalent amount of ferric ammonium oxalate was used to replace the mixture of ferric oxalate and guanidine oxalate. The two coated papers were then printed, both showing good quality of blues, and samples of both papers were then stored under ordinary conditions encountered in normal summer weather. Prints were made of portions of the stored paper from time to time to determine the appearance of blue backgrounds.

After seven days the paper made up with the ferric ammonium oxalate showed a distinctly bluish background and the unexposed portions failed to wash out white while the paper coated with a solution containing ferric oxalate and guanidine oxalate still showed a white background on the unexposed portions after a period of six months. Similar results were obtained on accelerated ageing tests where the papers were stored at high temperatures, and under conditions of high humidity, namely that papers coated with the ferric oxalate and guanidine oxalate mixture retained white backgrounds long after the other papers began to show strongly blue color in their backgrounds.

Ferric oxalate and guanidine oxalate may be used in other blueprint formulae as the light sensitive ferric salt, the proportions being chosen so as to form ferric guanidine oxalate in approximately stoichiometric amounts equivalent to the ferric salt for which it is substituted. Furthermore other salts such as guanidine binoxalate may be used to furnish the radicals for the ferric guanidine oxalate, and it is in no way intended to limit the invention to the details set forth in the example above. Broadly the invention can be applied to any blueprint formula containing a light-sensitive ferric salt which is of great advantage, for the blueprint coater is enabled to make up the improved solutions of the present invention without any special skill or equipment being necessary.

We claim:

1. A method of producing a blueprint coating which comprises mixing a guanidine oxalate solution having a pH between 5 and 6 with a ferric oxalate solution, the proportions of guanidine oxalate and ferric oxalate being substantially stoichiometrically equivalent to ferric guanidine oxalate, and adding a soluble ferricyanide to the mixture.

2. An acid blueprint coating solution comprising a mixture of guanidine oxalate and ferric oxalate in proportions substantially stoichiometrically equivalent to ferric guanidine oxalate, and a soluble ferricyanide, the guanidine oxalate being in weakly acid medium at the time of mixing with the ferric oxalate.

3. A light-sensitive blueprint paper coated with a solution comprising a mixture of guanidine oxalate and ferric oxalate in proportions substantially stoichiometrically equivalent to ferric guanidine oxalate, and a soluble ferricyanide, the guanidine oxalate being in weakly acid medium at the time of mixing with the ferric oxalate.

ROBERT BOWLING BARNES.
LEONARD PATRICK MOORE.
GARNET PHILIP HAM.